(12) United States Patent
Higashiyama

(10) Patent No.: US 6,985,449 B2
(45) Date of Patent: Jan. 10, 2006

(54) APPARATUS AND METHOD FOR CONFIGURING SPANNING TREE AND SPANNING TREE PROTOCOL SYSTEM AND BRIDGE SYSTEM

(75) Inventor: Mitsuru Higashiyama, Atsugi (JP)

(73) Assignee: Anritsu Corporation, Tokyo (JP)

( * ) Notice: Subject to any disclaimer, the term of this patent is extended or adjusted under 35 U.S.C. 154(b) by 940 days.

(21) Appl. No.: 09/805,276

(22) Filed: Mar. 13, 2001

(65) Prior Publication Data
US 2001/0025318 A1   Sep. 27, 2001

(30) Foreign Application Priority Data
Mar. 17, 2000  (JP) .............................. 2000-076543

(51) Int. Cl.
H04L 12/28 (2006.01)
(52) U.S. Cl. ...................................... 370/256; 370/401
(58) Field of Classification Search ................ 370/254, 370/256, 255, 401, 400, 408, 406, 389, 428; 709/220, 222, 242
See application file for complete search history.

(56) References Cited

U.S. PATENT DOCUMENTS

| | | | | |
|---|---|---|---|---|
| 5,926,463 | A  * | 7/1999 | Ahearn et al. .............. | 370/254 |
| 6,515,969 | B1 * | 2/2003 | Smith ......................... | 370/256 |
| 6,678,241 | B1 * | 1/2004 | Gai et al. .................... | 370/216 |
| 6,680,917 | B1 * | 1/2004 | Seaman ....................... | 370/256 |
| 6,697,339 | B1 * | 2/2004 | Jain ............................ | 370/256 |
| 6,717,922 | B2 * | 4/2004 | Hsu ............................ | 370/258 |
| 6,801,506 | B1 * | 10/2004 | Dey ........................... | 370/256 |

OTHER PUBLICATIONS

ISO/IEC 15802-3: 1998; (E) ANSI/IEEE Std 802. 1D, 1998 Edition, Local and Metropolitan Area Networks: Media Access Control (MAC) Bridges, pp. 58-75, 8. the Spanning Tree Algorithm and Protocol.
IEEE std. 802. 1Q-1998 Local and Metropolitan Area Networks: Virtual Bridges Local Area Networks, pp. 62-69, 9. Tagged frame format.

* cited by examiner

Primary Examiner—Chau Nguyen
Assistant Examiner—Ricardo Pizarro
(74) Attorney, Agent, or Firm—Frishauf, Holtz, Goodman & Chick, P.C.

(57) ABSTRACT

An apparatus for configuring a spanning tree is used for a network in which a plurality of virtual LANs coexist. This apparatus for configuring the spanning tree has at least one bridge and a holding section. The above at least one bridge has a plurality of ports, and is capable of configuring a plurality of virtual LANs by logically combining the plurality of ports. The holding section holds on the bridge for each of the plurality of virtual LANs, information that is a combination between a code for identifying each of the plurality of virtual LANs configured by the bridge and a code for identifying a root bridge in the spanning tree for each of the plurality of virtual LANs.

8 Claims, 5 Drawing Sheets

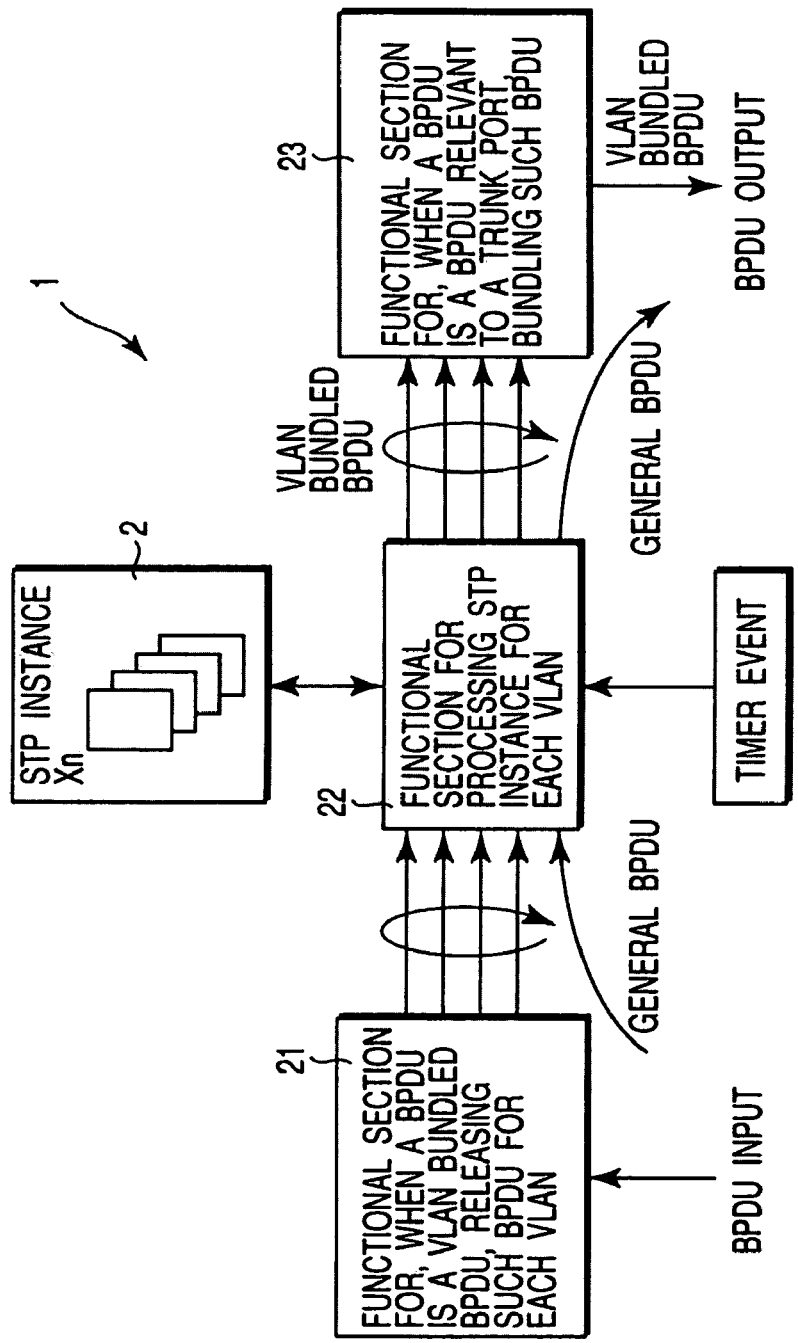
F I G. 2

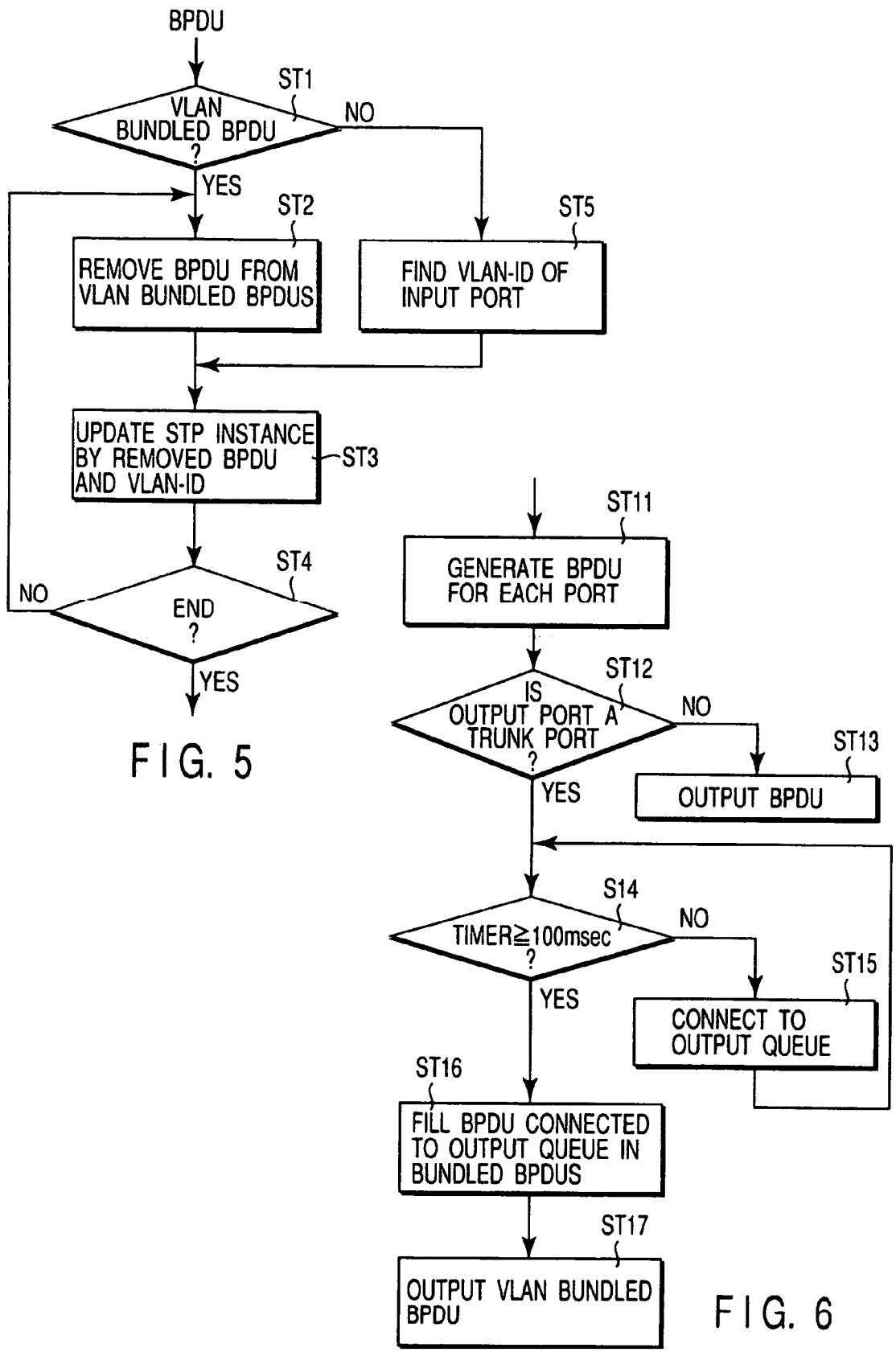

APPARATUS AND METHOD FOR CONFIGURING SPANNING TREE AND SPANNING TREE PROTOCOL SYSTEM AND BRIDGE SYSTEM

CROSS-REFERENCE TO RELATED APPLICATIONS

This application is based upon and claims the benefit of priority from the prior Japanese Patent Application No. 2000-076543, filed Mar. 17, 2000, the entire contents of which are incorporated herein by reference.

BACKGROUND OF THE INVENTION

The present invention pertains to an apparatus and method for configuring a spanning tree. In particular, the present invention relates to an apparatus and method for configuring a spanning tree and a spanning tree protocol system and bridge system employing a spanning tree protocol and a bridge comprising the protocol that can correspond to a logical LAN employing a switching HUB, irrelevant to a physical position (network configuration), a VLAN (Virtual LAN) which can be segmented by mixing a physical mode (for example, Ethernet or ATM-LAN) or communication protocols (for example, TCP/IP or NetWare).

In a network containing a redundant route caused by a plurality of bridges, a spanning tree protocol is used for determining a route.

For example, as shown in FIG. 7, assume a network over which LAN 1 and LAN 2 are connected to each other by means of a bridge A.

Here, in the case where of a network over which node "n1" such as personal computer is connected to LAN 1, and further, HUB 1 is connected to LAN 2, packets transmitted from the node "n1" are transmitted to all nodes of a broadcast domain including node "n2" such as personal computer connected to the HUB 1 via LAN 1→bridge A→LAN 2→HUB 1.

Over such network, when HUB 2 is connected to LAN 1 and LAN 2 in parallel to bridge A, a packet transmitted from the node "n1" loops over the network like LAN 1→bridge A→LAN 2→HUB 2→LAN 1→bridge A→LAN 2→HUB 2. As a result, a packet cannot be transmitted from a node other than node "n1" (node in a broadcast domain other than node "n1").

In the case where a network is configured by only bridge A and HUB 1 as shown in FIG. 7, a spanning tree is employed to prevent a packet transmitted from a node from looping over the network.

In addition, as shown in FIG. 8, in the case where two bridges A and B are connected in parallel between LAN 1 to which node "n1" such as personal computer is connected and LAN 2 to which HUB 1 is connected, thereby making communication among nodes "n2", "n3", "n4", . . . such as personal computers connected to node "n1" and HUB 1, one bridge A is generally used to make communication. When this bridge A is linked down, the other bridge B is used to make communication, whereby a spanning tree is employed in order to cause a network to provide redundancy.

Here, basic algorithm and protocol of the spanning tree consists of the following items (1) to (5) (Refer to ISO/IEC 15802-3: 1998 (E) ANSI/IEEE Std 802. 1D, 1998 Edition, LOCAL AND METROPOLITAN AREA NETWORKS: MEDIA ACCESS CONTROL (MAC) BRIDGES, pp. 58–75, 8. the Spanning Tree Algorithm and Protocol).

(1) A special frame called Configuration Bridge Protocol Data Units (hereinafter, referred to as BPDU) is exchanged between bridges.

The following works are performed based on this exchanged BPDU.

(2) A network root bridge is selected.

Only one root bridge exists in the entire LAN bridge connected.

(3) Each bridge computes the shortest route that reaches a root bridge (A port that provides the shortest route to the root bridge is called a root port).

(4) With respect to each LAN, a "designated bridge" is selected from a bridge connected to such each LAN.

(5) Each bridge selects a port (designated port) that belongs to a spanning tree and a port (blocked port) that does not belong to such spanning tree.

All data frames received at a blocked port are discarded.

In addition, frame transmission from a blocked port is not performed at all.

A received BPDU is not forwarded at all.

A data portion of the above mentioned BPDU includes at least root ID, bridge ID, and root path cost.

Root ID is an ID of a root bridge (or a bridge assumed to be such root bridge), and is generated based on a MAC address of such bridge and a priority designated by an administrator.

Bridge ID is an ID of a bridge that transmits a BPDU, and is generated based on a MAC address of such bridge and a priority designated by an administrator.

A root path cost is a cost of the (possible) shortest route from a bridge that transmits a BPDU to a root bridge.

In an initial state (when a power is supplied), each bridge is a root bridge itself, and it is assumed that a root path cost is 0.

Each bridge transmits the initial value of a BPDU to all ports, and at the same time, receives the BPDU transmitted from another bridge from all the ports.

In the case where a bridge has received a better BPDU from a port, such bridge stops transmission of BPDU to that port, and then, changes the value of the BPDU to be transmitted by the bridge itself.

In this manner, in the case where a spanning tree enters a stable state, only one bridge transmits a BPDU among each LAN.

For example, in the case where BPDU 1 and BPDU 2 are present, it is judged which of the above two BPDUs is better in accordance with rules (1) to (4) below.

(1) In the case where root ID of BPDU 1 is numerically smaller than that of BPDU 2, it is judged that BPDU 1 is better than BPDU 2.

(2) In the case where root ID of BPDU 1 is numerically equal to that of BPDU 2, if a root path cost of BPDU 1 is smaller than that of BPDU 2, it is judged that BPDU 1 is better than BPDU 2.

(3) In the case where root ID of BPDU 1 is numerically equal to that of BPDU 2, and a root path cost of BPDU 1 is equal to that of BPDU 2, if bridge ID of BPDU 1 is numerically smaller than that of BPDU 2, it is judged that BPDU 1 is better than BPDU 2.

(4) In the case where root ID of BPDU 1 numerically equal to that of BPDU 2, a root path cost of BPDU 1 is equal to that of BPDU 2, and bridge ID of BPDU 1 is numerically equal to that of BPDU 2, if port ID of BPDU 1 is smaller than that of BPDU 2, it is judged that BPDU 1 is better than BPDU 2.

Then, each bridge compares the initial value of its own BPDU with that of the BPDU from another bridge received from all ports, and selects root ID from the best BPDU.

Next, each bridge computes its own root path cost in accordance with (root path cost)=(root path cost in the best BPDU)+path cost.

A path cost is a cost to the root that each port individually has, and the value of the cost can be set by an administrator.

Once a root ID, a route port, and a root path cost are defined, each bridge updates the content of BPDU transmitted by such each bridge itself.

Further, its own updated BPDU is compared with BPDU received from a port other than root port, and it is judged whether or not each port other than root port is a designated bridge itself.

A port that is a designated bridge is called a designated port, and a port that is not a designated bridge is called a blocked port.

In BPDU transmission and data frame forwarding to a root port, a designated port and a blocked port, a data frame is forwarded at the root port without transmitting BPDU; BPDU is transmitted, and a data frame is forwarded at the designated port; and BPDU is not transmitted, and a data frame is not forwarded at the blocked port.

In this manner, once a spanning tree is configured, each bridge performs regular operations described in (1) to (4) below.

These regular operations are required for reconfiguring a spanning tree that has been configured due to a bridge fault or addition of new bridge.

(1) BPDU includes an element called "message age".

This value denotes an elapsed time after a root bridge has generated a BPDU that corresponds to the above BPDU.

(2) A root bridge transmits its own BPDU periodically to all ports. At this time, "message age" is set to 0.

(3) Each bridge stores a received BPDU, and increases the value of the "message age" of the BPDU stored in each port with an elapse of time (message age timer).

(4) A bridge other than root bridge transmits its own BPDU when it receives a BPDU from a root port.

At this time, as a value of the "message age", there is used a value equal to or greater than the "message age" of the root port and greater than the "message age" of the received BPDU.

Here, the reconfiguration of the spanning tree occurs in any of the cases described in (1) and (2) below.

(1) In the case where the "message age" timer of the stored BPDU times out (in the case where a max age is exceeded); or (2) In the case where a BUDU better than that stored in a port or a BPDU with the small value of the message age is received from the same port.

In the case where any of the above events occurs, a bridge performs re-computation for a root ID, a root cost, and a root port.

In the meantime, it is very dangerous to perform data frame transmission before all the bridges over a network enters a normal state after configuration (reconfiguration) of a spanning tree has been started.

This is because there is a possibility that a temporary loop occurs during spanning tree configuration.

Therefore, even if each bridge determines its own designated port, it does not start data frame forwarding immediately.

There are three types of the states of each port in a bridge:

(1) listening: No work concerning a data frame is carried out.

(2) learning: Although the learning of a starting MAC address is performed, forwarding is not performed.

(3) forwarding: Data frame forwarding is performed.

The lengths of the listening state and learning state are called a "forward delay". A root bridge determines its value, enters its value in a BPDU, and transmits the fact to each bridge.

In addition, a timer employed in the listening state and learning state is called a "forwarding timer".

If spanning tree reconfiguration occurs, a host position changes, and the contents of an old learning table may be incorrect.

Thus, the bridge corresponding to a spanning tree has the following two kinds of states as timeout values of the learning table aging timer.

(1) Normal value: This value is set to a long time such as a few minutes.

(2) A value used after topology change: This value is the same as the forward delay value.

When a bridge senses spanning tree reconfiguration, the timeout value of the learning table aging timer is set to a value identical to forward delay for a predetermined period of time.

In the meantime, a spanning tree algorithm and protocol have a system that notifies to all bridges that spanning tree reconfiguration has occurred as in (1) to (5) below.

(1) When a bridge senses a topology change, that bridge transmits a frame called TCN-BPDU (Topology Change Notification BPDU) to a root port with hello time intervals.

This transmission is continued until a BPDU in which a TCA (Topology Change Acknowledgment) flag is set has been received from the root port.

(2) A bridge which has received TCN-BPDU also transmits TCN-BPDU to its own root port.

On the other hand, to a port that receives a TCN-BPDU, a BPDU TCA flag is set, and a BPDU is transmitted during transmission of the next BPDU.

(3) In the case where a root bridge receives a TCN-BPDU or the state of its own port changes, the root bridge transmits a BPDU in which a TC (Topology Change) flag is set from that time to a max age+forward delay time.

(4) A bridge which has received the TC flag set BPDU from a root port sets a TC flag for its own BPDU, and transmits such BPDU.

This transmission is continued until a BPDU in which a TC flag is not set has been received.

(5) While a bridge receives TC flag set BPDU from the root port, the bridge uses the value of "forward delay" as a timeout value of the learning table aging timer.

In this way, a spanning tree has an algorithm for automatically removing a loop in a redundant bridge network, and automatically sensing a network topology change caused by a device fault or cable failure, thereby automatically changing a network topology so as to prevent a loop from being produced.

In the meantime, there has been a problem that a spanning tree protocol specified under the above described IEEE Std 802. 1D does not correspond to a VLAN.

This is because a spanning tree configures a tree structure irrelevant to a VLAN topology.

In more detail, for example, as shown in FIG. 9, in the case where VLAN 1 and VLAN 2 are mixed in bridge A and bridge B to configure a network, when a spanning tree protocol specified under the above described IEEE std 802.

ID is employed, such network is regarded as one loop. Thus, a spanning tree cannot be constructed for each VLAN, and a place that should not be essentially blocked (VLAN 1 in FIG. 1, for example) is blocked.

As a result, there has been a problem that data communication at such blocked place becomes impossible.

In the meantime, in VLAN Trunk Port specified under IEEE Std 802. IQ (refer to IEEE std 802. 1Q-1998 LOCAL AND METROPOLITAN AREA NETWORKS: VIRTUAL BRIDGES LOCAL AREA NETWORKS, pp. 62–69, 9. Tagged frame format), a plurality of VLANs exist at the same port.

Thus, there has been a problem that BPDUs must be transmitted and received by the number of VLANs, and a load on the incorporated CPU is increased, thus requiring a long processing time and causing lowered communication efficiency.

BRIEF SUMMARY OF THE INVENTION

In view of the foregoing problems, it is an object of the present invention to provide an apparatus for configuring a spanning tree protocol and a spanning tree employing a bridge comprising the protocol that can operate even over a network in which a plurality of VLANs coexist, the apparatus capable of reducing the number of BPDUs transmitted and received at a VLAN Trunk Port (hereinafter, referred to as a VLAN trunk port) and capable of reducing a processing load, thereby improving communication efficiency.

In view of the foregoing problems, it is another object of the present invention to provide an apparatus for configuring a spanning tree protocol and a spanning tree employing a bridge comprising the protocol that can operate even over a network in which a plurality of VLANs coexist, the apparatus capable of reducing the number of BPDUs transmitted and received at a VLAN Trunk Port (hereinafter, referred to as a VLAN trunk port) and capable of reducing a processing load, thereby improving communication efficiency.

It is still another object of the present invention to provide a spanning tree protocol system that can operate even over a network in which a plurality of VLANs coexist, the system capable of reducing the number of BPDUs transmitted and received at a VLAN Trunk Port (hereinafter, referred to as a VLAN trunk port) and capable of reducing a processing load, thereby improving communication efficiency.

It is still another object of the present invention to provide a bridge system that can be operate even over a network in which a plurality of VLANs coexist, the bridge system used for a network in which there coexist a plurality of VLANs to which a spanning tree protocol capable of reducing the number of BPDUs transmitted and received at a VLAN Trunk Port (hereinafter, referred to as a VLAN trunk port) and capable of reducing a processing load, thereby improving communication efficiency is applied.

In order to achieve the above object, according to a first aspect of the present invention, there is provided an apparatus for configuring a spanning tree used for a network in which a plurality of virtual LANs coexist comprising:

at least one bridge having a plurality of ports, the bridge capable of configuring a plurality of virtual LANs by logically combining the plurality of ports; and holding means for holding on the bridge by each of the plurality of virtual LANs, information that is a combination between a code for identifying each of the plurality of virtual LANs configured by the bridge and a code for identifying a root bridge in a spanning tree for each of the plurality of virtual LANs.

In addition, in order to achieve the above object, according to a second aspect of the present invention, there is provided an apparatus according to the first aspect, wherein the holding means is provided by the number of virtual LANs in the device as a VLAN-ID for each of the plurality of virtual LANs that is information to be held in the bridge and as a spanning tree protocol instance that is a database containing an MAC address of a root bridge in the plurality of virtual LANs.

In addition, in order to achieve the above object, according to a third aspect of the present invention, there is provided an apparatus according to the first aspect, further comprising:

means for discriminating whether or not Configuration Bridge Protocol Data Units (hereinafter, referred to as BPDUs) that the bridge receives bundle BPDUs that correspond to a plurality of VLANs in one packet, and releasing the bundled BPDUs for each VLAN;

means for processing a spanning tree by instance of each VLAN based on the BPDU, thereby updating the instance; and means for discriminating whether or not a BPDU outputted after updating the instance is a BPDU relevant to a trunk port, and when the BPDU is the BPDU relevant to trunk port, bundling a plurality of BPDUs in one packet, and outputting them.

In addition, in order to the above object, according to a fourth aspect of the present invention, there is provided a method for configuring a spanning tree used for a network in which a plurality of virtual LANs coexist, the method comprising the steps of:

providing at least one bridge having a plurality of ports, the bridge being capable of configuring a plurality of virtual LANs by logically combining the plurality of ports; and holding on the bridge for each of the plurality of virtual LANs, information that is a combination between a code for identifying each of the plurality of virtual LANs configured by the bridge and a code for identifying a root bridge in a spanning tree for each of the plurality of virtual LANs.

In addition, in order to achieve the above object, according to a fifth aspect of the present invention, there is provided an apparatus for configuring a spanning tree used for a network in which a plurality of virtual LANs coexist, the apparatus comprising:

at least two bridges each having a plurality of ports, the bridges each being capable of configuring a plurality of virtual LANs by logically combining the plurality of ports;

holding means for holding on the bridge for each of the plurality of virtual LANs, information that is a combination between a code for identifying each of the plurality of virtual LANs configured by the bridge and a code for identifying a root bridge in a spanning tree for each of the plurality of virtual LANs;

output means for, when there is outputted plural items of spanning tree configuration information containing a code in which one of the bridges identifies a root bridge for each of the plurality of virtual LANs, bundling in one packet at least two items of spanning tree configuration information contained in the plurality of spanning tree configuration information and outputting them; and control means for acquiring the spanning tree configuration information on each of the plurality of virtual LANs from the packet in a bridge which receives the packet, thereby controlling opening and closing of each of the plurality of ports that the bridge has for each of the plurality of virtual LANs.

In addition, in order to achieve the above object, according to a sixth aspect of the present invention, there is provided an apparatus according to the fifth aspect, wherein the holding means is provided by the number of virtual LANs in the apparatus as a spanning tree protocol instance that is a database containing a VLAN-ID of each of the plurality of virtual LANs that is information to be held on the bridge and an MAC address of a root bridge in the plurality of virtual LANs.

In addition, in order to achieve the above object, according to a seventh aspect of the present invention, there is provided an apparatus according to the sixth aspect, further comprising:

means for discriminating whether or not BPDUs that the bridge receives bundled BPDUs that correspond to a plurality of VLANs in one packet, and releasing the bundled BPDUs for each VLAN;

means for processing spanning tree by instance for each VLAN based on the BPDU, and updating the instance; and means for discriminating whether or not a BPDU to be outputted after updating the instance is a BPDU relevant to a trunk port, and, when the BPDU is the BPDU relevant to the trunk port, bundling a plurality of BPDUs in one packet, and outputting them.

In addition, in order to achieve the above object, according to an eighth aspect of the present invention, there is provided a method for configuring a spanning tree used for a network in which a plurality of virtual LANs coexist, the method comprising the steps of:

providing at least two bridges each having a plurality of ports, the bridges each being capable of configuring a plurality of virtual LANs by logically combining the plurality of ports;

holding on the bridge for each of the plurality of virtual LANs, information that is a combination between a code for identifying each of the plurality of virtual LANs configured by the bridge and a code for identifying a root bridge in a spanning tree for each of the plurality of virtual LANs;

when there is outputted plural items of spanning tree configuration information containing a code in which one of the bridges identifies a root bridge for each of the plurality of virtual LANs, bundling in one packet at least two items of spanning tree configuration information contained in the plurality of spanning tree configuration information and outputting them; and acquiring the spanning tree configuration information on each of the plurality of virtual LANs from the packet in a bridge which receives the packet, thereby controlling opening and closing of each of the plurality of ports that the bridge has for each of the plurality of virtual LANs.

In addition, in order to achieve the above object, according to a ninth aspect of the present invention, there is provided a spanning tree protocol system, comprising:

a network in which a plurality of VLANs coexist and a spanning tree protocol is applied; and a spanning tree protocol instance having a database containing a VLAN-ID of at least the VLAN in the plurality of VLANs and an MAC address of a root bridge in the VLAN for each of the plurality of VLANs.

In addition, in order to achieve the above object, according to a tenth aspect of the present invention, there is provided a bridge system used for a network in which there exists a plurality of VLANs to which a spanning protocol is applied, the bridge system comprising:

at least one bridge having a plurality of ports, the bridge being capable of configuring a plurality of virtual LANs by logically combining the plurality of ports; and a spanning tree protocol instance having a database containing a VLAN-ID of at least the VLAN of the plurality of VLANs and an MAC address of a root bridge in the VLAN for each of the plurality of VLANs.

In addition, in achieve the above object, according to an eleventh aspect of the present invention, there is provided a bridge system used for a network in which there exists a plurality of VLANs to which a spanning tree protocol is applied, the bridge system comprising:

at least two bridges each having a plurality of ports, the bridges each being capable of configuring a plurality of virtual LANs by logically combining the plurality of ports;

a spanning tree protocol instance having a VLAN-ID of at least the VLAN of the plurality of VLANs and an MAC address of a root bridge in the VLAN for each of the plurality of VLANs;

output means for, when one of the bridges outputs plural items of spanning tree configuration information containing a code for identifying a root bridge for each of the plurality of virtual LANs, bundling in one packet at least two items of spanning configuration information contained in the plural items of spanning tree configuration information and outputting them; and control means for acquiring the spanning tree configuration information on each of the plurality of virtual LANs from the packet in a bridge which receives the packet, thereby controlling opening and closing of each of the plurality of ports that the bridge has for each of the plurality of virtual LANs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a view showing a block configuration of the bridge shown in FIG. 1;

FIG. 5 is a flow chart illustrating bridge input processing according to the present invention;

FIG. 6 is a flow chart illustrating bridge output processing according to the present invention;

FIG. 7 is a view illustrating an object of a conventional spanning tree;

FIG. 8 is a view illustrating an object of a conventional spanning tree; and

FIG. 9 is a view illustrating a problem when a conventional spanning tree specified under IEEE Std 802. ID is used for a network in which a plurality of VLANs coexist.

DETAILED DESCRIPTION OF THE INVENTION

Figure 1:
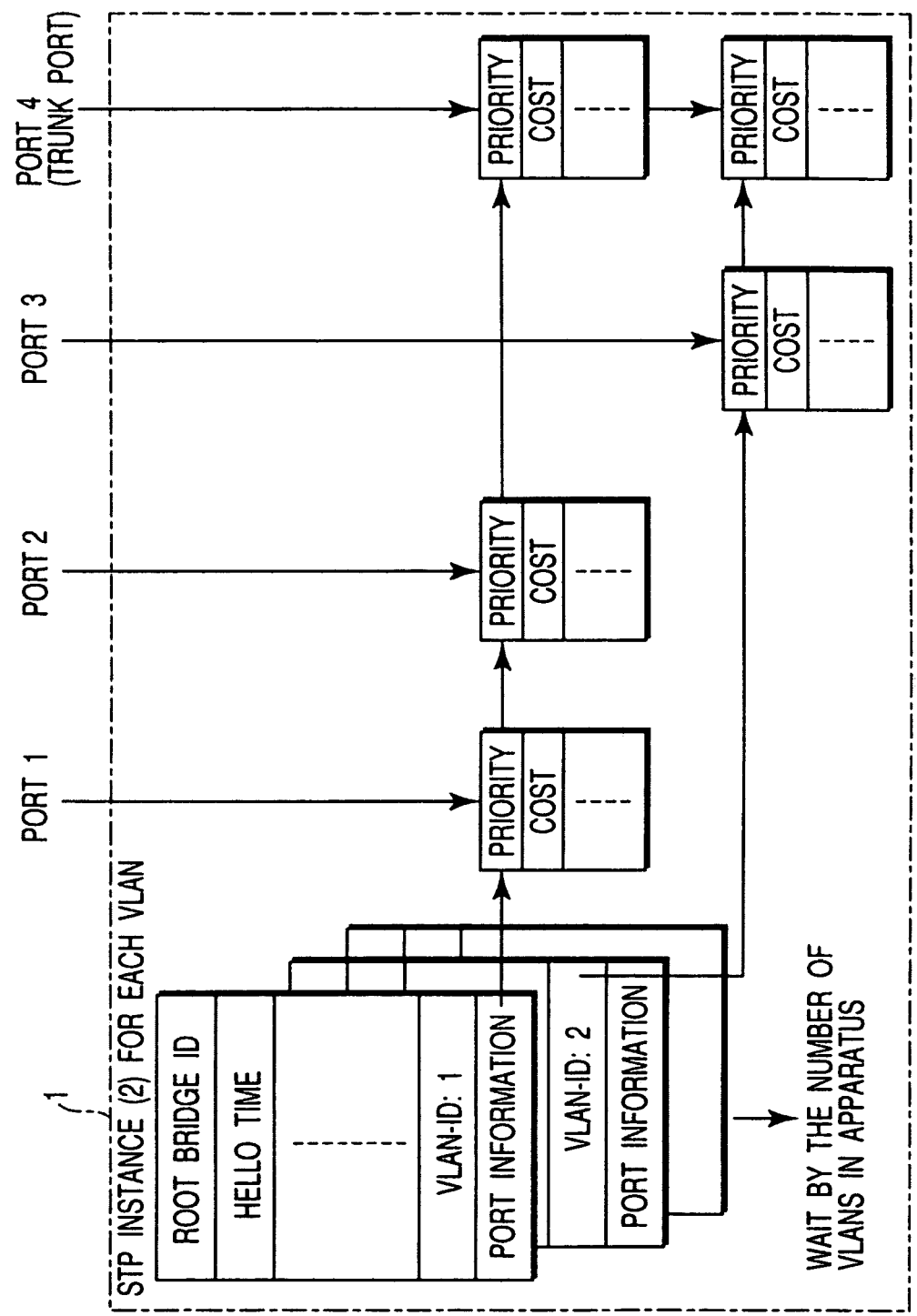
FIG. 1 is a view showing a general configuration of a bridge comprising a spanning protocol applied to the present invention.

Reference will now be made in detail to the presently preferred embodiments of the invention as illustrated in the accompanying drawings, in which like reference numerals designate like or corresponding parts.

Now, a general description of the present invention will be given here. In order to achieve the above object, the present invention is characterized in that, in a spanning tree protocol used for a network in which a plurality of VLANs coexist, there is provided an instance having a database containing at least a VLAN-ID of the VLAN and an MAC address of a root bridge in the VLAN for each of a plurality of LANs.

In addition, the present invention is characterized by comprising the steps of; in the above spanning tree protocol, discriminating whether or not received BPDUs are bundled BPDUs that correspond to a plurality of VLANs in one packet, and then, releasing the bundled BPDU for each VLAN; processing a spanning tree by instance of each LAN based on the BPDU, thereby updating the instance; and discriminating whether or not a BPDU outputted after updating the instance is a BPDU relevant to a trunk port, and, when the BPDU is the BPDU relevant to the trunk port, bundling a plurality of BPDUs in one packet, and then, outputting them.

In addition, the present invention is characterized in that, in a bridge employing a spanning tree protocol in which a plurality of VLANs coexist, an instance having a database containing at least a VLAN-ID of the VLAN and an MAC address of a root bridge in the VLAN is provided for each of a plurality of LANs.

In addition, the present invention is characterized by comprising a function for, in a bridge comprising the above spanning tree protocol, discriminating whether or not received BPDUs are bundled BPDUs that correspond to a plurality of VLANs in one packet, and then, releasing the bundled BPDU for each VLAN; a function for processing a spanning tree by instance of each LAN based on the BPDU, thereby updating the instance; a function for discriminating whether or not a BPDU outputted after updating the instance is a BPDU relevant to a trunk port, and; a function for, when the BPDU is the BPDU relevant to the trunk port, bundling a plurality of BPDUs in one packet, and then, outputting them.

Now, preferred embodiments of the present invention based on the above general description will be described with reference to the accompanying drawings.

FIG. 1 is a general configuration of a bridge comprising a spanning tree protocol applied to the present invention.

FIG. 2 is a block configuration of the bridge shown in FIG. 1.

In one embodiment of the present invention, in order to reduce the number of BPDUs transmitted and received at a VLAN trunk port that corresponds to a plurality of VLANs, means for bundling BPDUs that correspond to a plurality of VLANs is provided in one packet.

Thus, the bridge according to the present embodiment has as many spanning tree protocol instances (hereinafter, abbreviated as an STP instance) as the number of VLANs in the apparatus for each VLAN.

The STP instance used here is a database for a spanning tree containing at least a VLAN-ID of the VLAN and an MAC address of a root bridge in the VLAN.

In the bridge according to the present embodiment, in order to cope with a VLAN trunk port, BPDUs of individual VLANs are bundled from an STP instance, and further, the BPDU for each VLAN is acquired from the received BPDU. Based on the received BPDU (VLAN-ID and BPDU main body data), the STP instance is updated for each VLAN.

In the bridge according to the present embodiment, a spanning tree is reconfigured for each VLAN by referring to the updated STP instance.

Now, a configuration and input/output processing of the bridge according to the present embodiment will be described here.

As shown in FIG. 1, a bridge 1 according to the present embodiment has a plurality of ports (port 1, port 2, . . . ).

In an example shown in FIG. 1, there are provided four ports consisting of port 1, port 2, port 3 and port 4.

In an example shown in FIG. 1, port 4 is set to a trunk port.

In addition, port 1, port 2 and port 4 are connected to VLAN 1 (VLAN-ID: 1).

Further, port 3 and port 4 are connected to VLAN 2 (VLAN-ID: 2).

Whether each port is used as a general port or a trunk port is set by a user, and the setting information is stored in storage means (not shown) of the bridge 1.

The bridge 1 according to the present embodiment has an STP instance 2 of each VLAN inside the bridge.

This STP instance 2 is provided in number that corresponds to the number of VLANs in the apparatus. This instance consists of port information concerning each port such as root bridge ID, Hello Time, VLAN-ID, Priority or cost (root path cost).

The bridge 1 according to the present invention, as shown in FIG. 2, comprises a functional section 21 for, when BPDUs to be inputted are VLAN bundled BPDUs, releasing the VLAN bundled BPDUs for each VLAN; a functional section 22 for referring to an internal STP instance at a timing of an interrupt signal caused by a timer event based on a general BPDU or released BPDU, processing a spanning tree protocol by each VLAN, thereby updating the STP instance; and a functional section 23 for outputting a general BPDU after STP processing or outputting VLAN bundled BPDUs bundled within a predetermined period of time in one packet when the BPDUs are those relevant to a trunk port.

Now, the BPDUs used for the bridge 1 according to the present embodiment will be described here.

The BPDUs according to the present embodiment are divided into generally transmitted and received BPDUs and VLA bundled BPDUs transmitted and received over a trunk port.

These BPDUs are periodically transmitted from a root bridge to all bridges.

In contrast, a bridge that is not a root bridge transmits a BPDU to a lower bridge when the bridge receives the BPDU.

Figure 3:
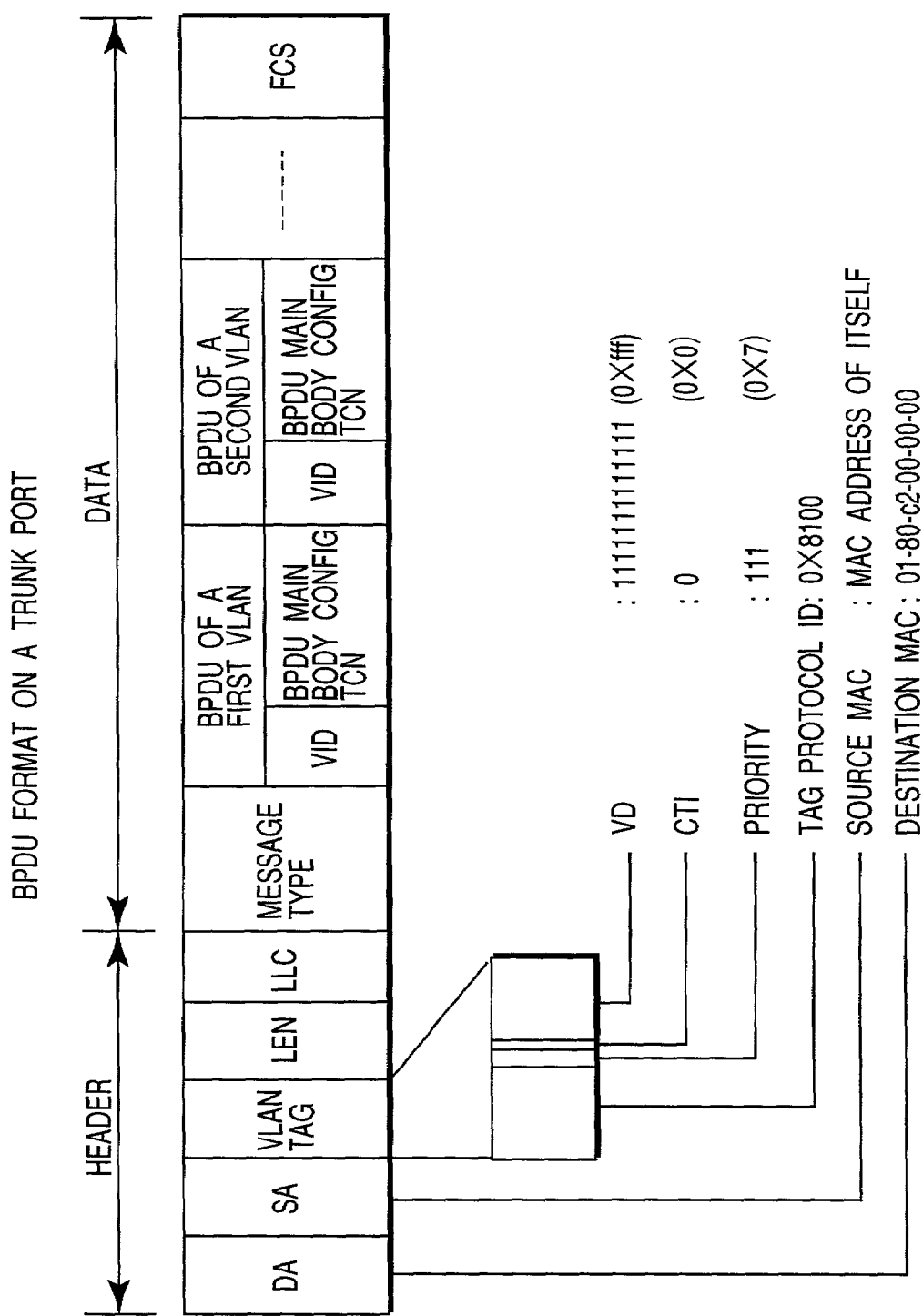
FIG. 3 is a view showing a frame format of a VLAN bundled BPDUs applied to the present invention.

FIG. 3 is a view showing a frame format of a VLAN bundled BPDU over a trunk port.

As shown in FIG. 3, the VLAN bundled BPDU is composed of a header portion and a data portion.

The header portion used here consists of Destination MAC: MAC: 01-80-c2-00-00-00 (DA), Source MAC: Local MAC address (SA), LVAN-TAG, LEN and LLC that indicate transmission source address, destination address, data length or the like.

In addition, VLAN-TAG is composed of Tag Protocol ID: 0x8100, priority: 111 (0x7), CTI: 0(0x0), VID: 111111111111 (0xfff).

The data portion consists of: a message type; a plurality of BPDUs corresponding to VLANs to be bundled in order to reduce a total amount of BPDU packets over a trunk port; and an FCS.

This message type is data for discriminating whether the BPDU is a general BPDU (Configuration BPDU (message type: 0) or TCN-BPDU (message type: 0x80) or whether or not the BPDU is a VLAN bundled BPDU.

In addition, a plurality of VLAN BPDUs filled in the data portion consists of a VID (VLAN-ID) indicating an address of the VLAN and a BPDU main body.

Figure 4A:
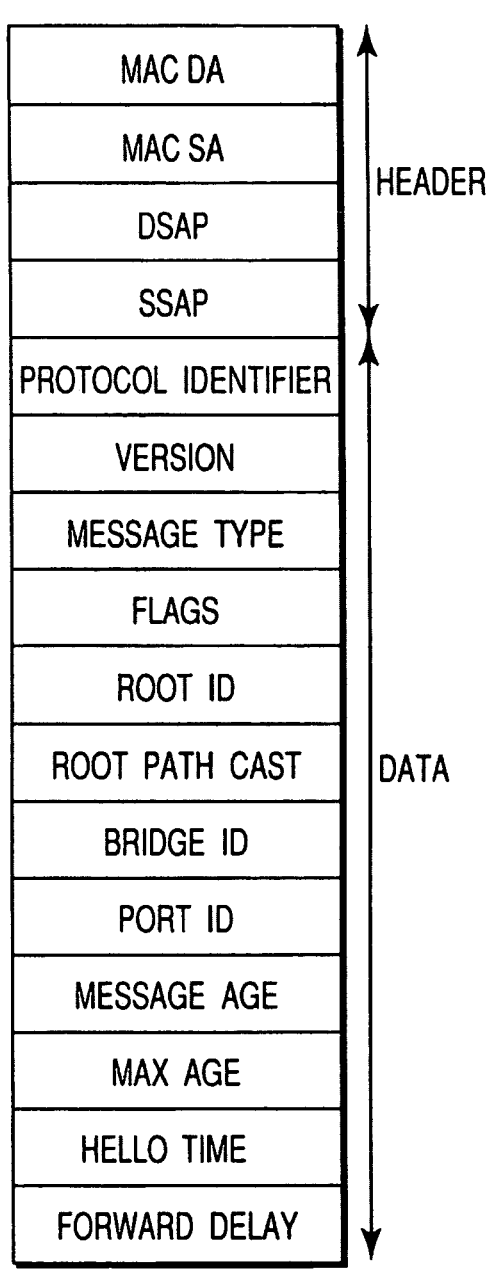
FIG. 4A to FIG. 4D are views each showing a frame format of a BPDU main body applied to the present invention.

FIG. 4A shows a frame format of the above BPDU main body.

Figure 4B:
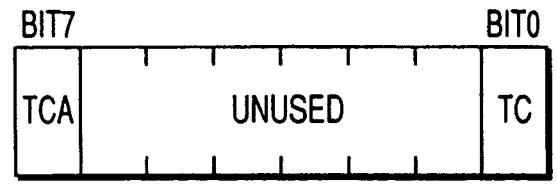

FIG. 4B shows a frame format of a flag contained in BPDU data.

Figure 4C:
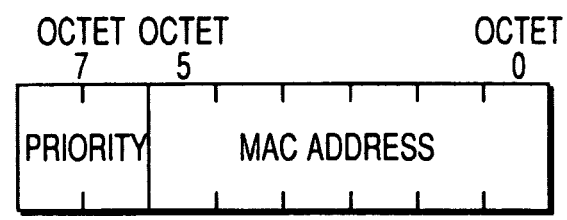

FIG. 4C shows a frame format of root ID, bridge ID contained in BPDU data.

Figure 4D:
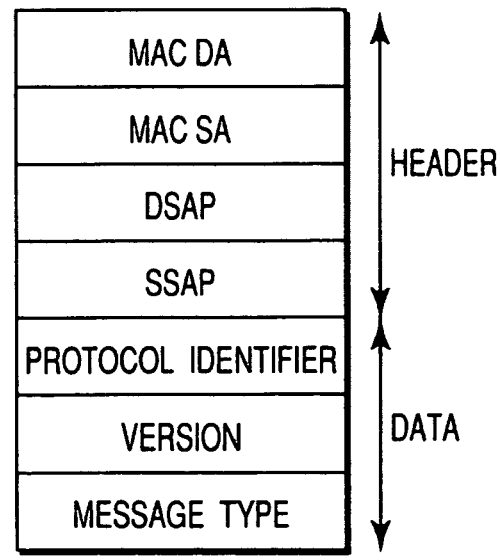

FIG. 4D shows a frame format of TCN-BPDU transmitted when a topology change is detected.

As shown in FIG. 4A, each BPDU is composed of a header portion and a data portion.

As shown in FIG. 4B, each flag is composed of TCA, an unused region, and TC.

A bridge which receives this TCA bit set BPDU from a root port stops transmission of TCN-BODU to the root port.

In addition, a bridge which receives the TC bit set BPDU from a root port sets the time-out value of a learning table aging timer to a value of forward delay until the bridge has received a BPDU in which a TC flag is not set. Then, the bridge itself transmits a BPDU in which a TC flag is set.

As shown in FIG. 4C, the upper 2 octets of root ID and bridge ID are a priority set by an administrator, and the lower 6 octets are a MAC address of a bridge.

These root ID and bridge ID take precedence to a priority set by the upper 2 octet administrator so that the high order or low order of the bridge can be discriminated by the scale of the entirety including the MAC address.

For example, in the case where the upper 2 octets of BPDU root ID of each bridge enters the default state, a bridge with the smallest MAC address of root ID becomes a root bridge.

Otherwise, a root path cost contained in BPDU data is the (possible) shortest cost to a root.

In addition, with respect to port ID contained in BPDU data, the higher 1 octet is a priority set by an administrator, and a lower 1 octet is an ID specific to a bridge.

In addition, "message age" contained in BPDU data indicates an elapsed time from a root bridge, and the unit is 1/256 seconds.

Therefore, in the case where the value is 256, it means that the root has transmitted a BPDU that corresponds to this BPDU 1 second before.

In addition, "max age" contained in BPDU indicates a BPDU validity, and the unit is 1/256 seconds.

In addition, "hello time" contained in BPDU data indicates a time interval for a root bridge to transmit a BPDU, and the unit is 1/256 seconds.

That is, a root bridge transmits a BPDU in "hello time" intervals.

In addition, "forward delay" contained in BPDU data indicates a parameter used for a learning table aging timer when a listening period, a learning period, or a spanning tree reconfiguration occurs, and the unit is 1/256 seconds.

A topology change timer is a timer for measuring a period for setting TC of the flag shown in FIG. 4D.

In a general BPDU, in the frame format shown in FIG. 3, one VLAN BPDU is filled in the data portion in one packet.

The "message type" is data that indicates whether the BPDU is Configuration BPDU or TCN-BPDU.

Now, input/output processing of the bridge 1 configured above will be described with reference to FIG. 5 and FIG. 6.

FIG. 5 shows a flow chart illustrating input processing executed by a bridge according to the present embodiment.

In this input processing, when a BPDU is inputted, it is discriminated whether or not that BPDU is a VLAN bundled BPDU (step ST1).

Specifically, it is discriminated whether or not that BPDU is a VLAN bundled BPDU by discriminating a state of a port at which the BPDU is inputted.

The state of this port is discriminated according to the fact that user port setting information indicates a general port or a trunk port.

Then, it is discriminated whether a BPDU inputted based on the inputted BPDU "message type" is a general BPDU (Configuration BPDU or TCN-BPDU) or a VLAN bundled BPDU.

When it is discriminated that the inputted BPDU is the VLAN bundled BPDU at the step ST1, a first BPDU is fetched from a data portion of the VLAN bundled BPDU (step ST2).

An STP instance corresponding to this VLAN-ID is updated by the BPDU main body of this fetched BPDU and VLAN-ID (step ST3).

In processing at the above steps ST2 and ST3, all BPDUs are fetched in order from the VLAN bundled BPDUs. This fetch is repeatedly executed by the BPDU main body of this fetched BPDU and VLAN-ID until the STP instance corresponding to each VLAN-ID has been updated (step ST4).

A spanning tree is reconfigured for each VLAN based on this updated STP instance.

When it is discriminated that an inputted BPDU is not a VLAN bundled BPDU at the step ST1, VLAN-ID of an input port is determined (step ST5).

That is, referring to VLAN-ID of VLAN-TAG at a header of the inputted BPDU, the STP instance corresponding to the VLAN-ID is updated based on the VLAN-ID and BPDU main body data (step ST3).

A spanning tree of the VLAN is reconfigured based on the updated STP instance.

FIG. 6 shows a flow chart of output processing executed at the bridge according to the present embodiment.

In this output processing, BPDUs are first generated for each port (step ST11).

Then, it is discriminated whether or not an output port is a VLAN trunk port (step ST12).

This discrimination is performed according to whether user port setting information indicates a general port or a trunk port.

When it is discriminated that the output port is not a VLAN trunk port, a general BPDU is outputted (step ST13).

In addition, when it is discriminated that the output port is the VLAN trunk port, it is discriminated whether or not a timer has elapsed a predetermined period of time (100 msec in an example of FIG. 6) (step ST14).

When it is judged that the timer has not elapsed a predetermined period of time, BPDUs are accumulated in data storage means such as buffer circuit (not shown) by means of processing for connecting to an output queue (step ST15). Then, processing returns to step ST14, where it is discriminated again whether or not the timer has elapsed a predetermined period of time.

When it is judged that the timer has elapsed a predetermined period of time at the step ST14, there is performed processing for filling the BPDUs connected to and accumulated in the output queue in the data portion of the VLAN bundled BPDU that consists of the frame format shown in FIG. 3 (step ST16).

Then, the VLAN bundled BPDU is outputted (step ST17).

According to the present embodiment, there can be provided a spanning tree protocol that operates even under a network in which a plurality of VLANs coexist.

That is, according to the present embodiment, an STP instance (data structure for computing a spanning tree) that is a database is provided for each VLAN, wherein an STP instance to be referred to is switched according to which VLAN is used to receive a BPDU; the STP instance is updated for each VLAN based on VLAN-ID of the received BPDU and data on the BPDU main body; and the spanning tree of each VLAN can be reconfigured based on this updated STP instance.

In addition, in BPDUs transmitted and received at a trunk port, a plurality of BPDUs corresponding to VLAN are bundled in one packet, and are transmitted and received as VLAN bundled BPDUs. Thus, the number of BPDUs transmitted and received at the trunk port can be reduced.

In this manner, a load on the incorporated CPU is reduced, the processing time is reduced, and communication efficiency can be improved.

As is evident from the foregoing description, according to the present invention, there can be provided a spanning tree protocol that operates even under a network in which a plurality of VLANs coexist, and a bridge comprising the protocol.

In addition, according to the present invention, the number of BPDUs transmitted and received at a trunk port can be reduced, a processing burden is reduced, and communication efficiency can be improved.

Therefore, according to the present invention, there can be provided a spanning tree protocol and an apparatus comprising a spanning tree employing a bridge comprising the protocol, capable of operating in a network in which a plurality of VLANs coexist; reducing the number of BPDUs transmitted and received at a VLAN Trunk Port (hereinafter, referred to as a VLAN trunk port); and reducing a processing burden, thereby improving communication efficiency.

In addition, according to the present invention, there can be provided a spanning tree protocol and a method of configuring a spanning tree employing a bridge comprising the protocol, capable of operating in a network in which a plurality of VLANs coexist; reducing the number of BPDUs transmitted and received at a VLAN Trunk Port (hereinafter, referred to as a VLAN trunk port); and reducing a processing burden, thereby improving communication efficiency.

Further, according to the present invention, there can be provided a spanning tree protocol system capable of operating in a network in which a plurality of VLANs coexist; reducing the number of BPDUs transmitted and received at a VLAN Trunk Port (hereinafter, referred to as a VLAN trunk port); and reducing a processing burden, thereby improving communication efficiency.

Still furthermore, according to the present invention, there can be provided a bridge system used for a network in which a plurality of VLANs coexist to which a spanning tree protocol is applied, capable of operating in a network in which a plurality of VLANs coexist; reducing the number of BPDUs transmitted and received at a VLAN Trunk Port (hereinafter, referred to as a VLAN trunk port); and reducing a processing burden, thereby improving communication efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for configuring a spanning tree for use in a network including a plurality of virtual LANs, said apparatus comprising:

at least one bridge having a plurality of ports, said plurality of virtual LANs being configured by logically combining the plurality of ports;

holding means for holding on the bridge for each of the plurality of virtual LANs configured by the bridge, a spanning tree protocol instance that is a database including: (i) a VLAN-ID that is a code for identifying a corresponding one each of the plurality of virtual LANs configured by the bridge, and (ii) an MAC address for identifying a root bridge in a spanning tree for the corresponding one of the plurality of virtual LANs;

means for discriminating whether Configuration Bridge Protocol Data Units (BPDUs) received by the bridge are bundled BPDUs corresponding to a plurality of the virtual LANs in one packet, and for releasing the bundled BPDUs for each of the corresponding virtual LANs when the BPDUs are discriminated to be bundled BPDUs;

means for processing the spanning tree protocol instance corresponding to the virtual LANs corresponding to the bundled BPDUs based on the corresponding released BPDU, thereby updating the spanning tree protocol instance; and means for discriminating whether a BPDU to be outputted after updating the instance is relevant to a trunk port, for bundling a plurality of BPDUs relevant to the trunk port in one packet, and for outputting the bundled plurality of BPDUs relevant to the trunk port.

2. A method for configuring a spanning tree for use in a network including a plurality of virtual LANs, said method comprising:

providing at least one bridge having a plurality of ports, said plurality of virtual LANs being configured by logically combining the plurality of ports;

holding on the bridge for each of the plurality of virtual LANs configured by the bridge, a spanning tree protocol instance that is a database including: (i) a VLAN-ID that is a code for identifying a corresponding one of the plurality of virtual LANs configured by the bridge, and (ii) an MAC address for identifying a root bridge in a spanning tree for the corresponding one of the plurality of virtual LANs;

identifying the spanning tree protocol instance of one of the plurality of virtual LANs corresponding to a received BPDU by determining a VLAN-ID of a Port at which the received BPDU is received and comparing the VLAN-ID of the port with the VLAN-ID of the spanning tree protocol instance.

3. An apparatus for configuring a spanning tree for use in a network including a plurality of virtual LANs, said apparatus comprising:

at least two bridges each having a plurality of ports, said plurality of virtual LANs being configured by logically combining the plurality of ports;

holding means for holding on each of the bridges for each of the plurality of virtual LANs configured by the respective bridge, information including a code for identifying a respective one of the plurality of virtual LANs and a code for identifying a root bridge in a spanning tree corresponding to the respective one of the plurality of virtual LANs;

output means for, when a plurality of items of spanning tree configuration information are outputted, bundling at least two of the items of spanning tree configuration information in one packet and outputting the bundled at least two of the items of spanning tree configuration information, wherein the spanning tree configuration information includes another code in which one of the bridges identifies the root bridge for each of the plurality of virtual LANs; and control means for, in one of the bridges which receives the packet, acquiring from the packet the items of spanning tree configuration information, which correspond to said each of the plurality of virtual LANs, to thereby control opening and closing of each of the plurality of ports of said one bridge for said each of the plurality of virtual LANs configured by the bridge.

4. An apparatus according to claim 3, wherein the holding means holds on said each bridge a spanning tree protocol instance corresponding to said each of the plurality of virtual LANs configured by the bridge as said information, wherein the spanning tree protocol instance is a database containing a VLAN-ID of a corresponding one of the plurality of virtual LANs and an MAC address of a root bridge in the corresponding one of the plurality of virtual LANs.

5. An apparatus according to claim 4, further comprising:
means for discriminating whether Configuration Bridge Protocol Data Units (BPDUs) received by at least one of the bridges are bundled BPDUs that correspond to a plurality of the virtual LANs in one packet, and for releasing the bundled BPDUs for each of the corresponding virtual LANs when the BPDUs are discriminated to be bundled BPDUs;
means for processing the spanning tree protocol instance corresponding to each of the virtual LANs corresponding to the bundled BPDUs, based on the corresponding released BPDU, thereby updating the spanning tree protocol instance; and
means for discriminating whether a BPDU to be outputted after updating the instance is relevant to a trunk port, for bundling a plurality of BPDUs relevant to the trunk port in one packet, and for outputting the bundled plurality of BPDUs relevant to the trunk port.

6. A method for configuring a spanning tree for use in a network including a plurality of virtual LANs, said method comprising:
providing at least two bridges each having a plurality of ports, said plurality of virtual LANs being configured by logically combining the plurality of ports;
holding on each of the bridges for each of the plurality of virtual LANs configured by the respective bridge, information including a code for identifying a respective one of the plurality of virtual LANs and a code for identifying a root bridge in a spanning tree corresponding to the respective one of the plurality of virtual LANs;
when a plurality of items of spanning tree configuration information are outputted, bundling at least two of the items of spanning tree configuration information in one packet and outputting the bundled at least two of the items of spanning tree configuration information, wherein the spanning tree configuration information includes another code in which one of the bridges identifies a root bridge for each of the plurality of virtual LANs; and
in one of the bridges which receives the one packet, acquiring from the one packet the items of spanning tree configuration information, which correspond to said each of the plurality of virtual LANs, to thereby control opening and closing of each of the plurality of ports of said one bridge for said each of the plurality of virtual LANs configured by the bridge.

7. A bridge system for use in a network including a plurality of virtual LANs to which a spanning tree protocol is applied, said bridge system comprising:
at least two bridges each having a plurality of ports, said plurality of virtual LANs being configured by logically combining the plurality of ports;
a spanning tree protocol instance for each of the plurality of virtual LANS, said spanning tree protocol instance including a VLAN-ID of at least the corresponding virtual LAN and an MAC address of a root bridge in the corresponding virtual LAN;
output means for, when one of the bridges outputs a plurality of items of spanning tree configuration information, bundling in one packet at least two of the items of spanning tree configuration information and outputting the bundled at least two of the items of spanning tree configuration information, wherein the spanning tree configuration information includes a code identifying a root bridge for each of the plurality of virtual LANs; and
control means for, in one of the bridges which receives the packet, acquiring from the packet the items of spanning tree configuration information, which correspond to said each of the plurality of virtual LANs, to thereby control opening and closing of each of the plurality of ports of said one bridge which receives the packet for said each of the plurality of virtual LANs configured by said one bridge which receives the packet.

8. An apparatus for configuring a spanning tree for use in a network including a plurality of virtual LANs, said apparatus comprising:
at least one bridge having a plurality of ports, said plurality of virtual LANs being configured by logically combining the plurality of ports;
holding means for holding on the bridge for each of the plurality of virtual LANs configured by the bridge, a spanning tree protocol instance that is a database including: (i) a VLAN-ID that is a code for identifying a corresponding one of the plurality of virtual LANs configured by the bridge, and (ii) an MAC address for identifying a root bridge in a spanning tree for the corresponding one of the plurality of virtual LANs; and
means for identifying the spanning tree protocol instance of one of the plurality of virtual LANs corresponding to a received BPDU by determining a VLAN-ID of a port at which the received BPDU is received and comparing the VLAN-ID of the port with the VLAN-ID of the spanning tree protocol instance.

* * * * *